United States Patent
Yamashita et al.

(10) Patent No.: US 9,360,012 B2
(45) Date of Patent: Jun. 7, 2016

(54) DIFFERENTIAL PRESSURE REGULATING VALVE AND MOTOR-DRIVEN COMPRESSOR HAVING DIFFERENTIAL PRESSURE REGULATING VALVE

(71) Applicant: KABUSHIKI KAISHA TOYOTA JIDOSHOKKI, Kariya-shi, Aichi-ken (JP)

(72) Inventors: Takuro Yamashita, Aichi-ken (JP); Shinji Tsubai, Aichi-ken (JP); Kazuhiro Kuroki, Aichi-ken (JP); Hiroyuki Gennami, Aichi-ken (JP); Kenji Yokoi, Aichi-ken (JP); Tomoyoshi Inagaki, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 104 days.

(21) Appl. No.: 13/743,747

(22) Filed: Jan. 17, 2013

(65) Prior Publication Data

US 2013/0189143 A1    Jul. 25, 2013

(30) Foreign Application Priority Data

Jan. 20, 2012 (JP) ................. 2012-010201

(51) Int. Cl.
*F01C 1/02* (2006.01)
*F04C 28/24* (2006.01)
(Continued)

(52) U.S. Cl.
CPC ............. *F04C 28/24* (2013.01); *F04C 18/0215* (2013.01); *F04C 27/005* (2013.01); *F16K 31/44* (2013.01)

(58) Field of Classification Search
CPC .... F04C 27/005; F04C 18/0215; F04C 28/24; F04C 23/008; F04C 1/0215; F04C 2021/1643; F16K 31/44; F16K 15/04; F16K 15/044
USPC ............ 418/55.1, 55.5, 57, 55, 270; 137/539, 137/540
See application file for complete search history.

(56) References Cited

U.S. PATENT DOCUMENTS 2,240,612 A * 5/1941 Ekstedt .................. 38/77.81
2,329,087 A * 9/1943 Russell ................ F16K 15/183
137/539
(Continued)

FOREIGN PATENT DOCUMENTS

JP        7-229484 A     8/1995
JP     2000-337273 A    12/2000
(Continued)

OTHER PUBLICATIONS

Translation—JP2005127173A Scroll Compressor, Aug. 2014, entire document.*
(Continued)

*Primary Examiner* — Jorge Pereiro
*Assistant Examiner* — Jason T Newton
(74) *Attorney, Agent, or Firm* — Sughrue Mion, PLLC

(57) ABSTRACT

A differential pressure regulating valve is disposed in a fluid passage. The differential pressure regulating valve includes a valve chamber, a valve hole, a valve body, a support member and an urging member. The valve chamber is formed in the fluid passage and having a cylindrical shape. The valve hole is formed in the fluid passage as an opening which communicates with the valve chamber. The valve body is disposed in the valve chamber and adapted to open and close the valve hole. The support member is fixedly mounted to the valve chamber and extending across flowing direction of the fluid in the valve chamber. The support member has a communication passage for fluid communication between a first valve chamber and a second valve chamber. The urging member is disposed between the support member and the valve body for urging the valve body toward the valve hole.

12 Claims, 6 Drawing Sheets

(51) Int. Cl.
*F04C 27/00* (2006.01)
*F04C 18/02* (2006.01)
*F16K 31/44* (2006.01)

(56) References Cited

U.S. PATENT DOCUMENTS

| | | | | |
|---|---|---|---|---|
| 2,480,108 A * | 8/1949 | Barker | ................ | F16K 15/04 137/539 |
| 2,865,398 A * | 12/1958 | Popovich | ................ | B60T 11/30 137/539 |
| 3,056,423 A * | 10/1962 | Lieser | ................ | F16K 15/044 137/493.7 |
| 3,421,547 A * | 1/1969 | Aslan | ................ | F16K 15/044 137/539 |
| 4,234,056 A * | 11/1980 | Farrell | ................ | F16N 23/00 137/539 |
| 4,539,959 A * | 9/1985 | Williams | ................ | 123/456 |
| 4,893,650 A * | 1/1990 | Chisholm | ................ | F16K 15/044 137/539 |
| 5,107,890 A * | 4/1992 | Gute | ................ | F16K 15/044 137/539 |
| 5,404,904 A * | 4/1995 | Glaser | ................ | F16K 17/06 137/539 |
| 5,419,689 A * | 5/1995 | Holbrook | ................ | 417/507 |
| 7,101,160 B2 * | 9/2006 | Gennami et al. | ................ | 418/55.6 |
| 7,648,346 B2 * | 1/2010 | Murakami et al. | ................ | 417/222.2 |
| 8,202,071 B2 | 6/2012 | Kii et al. | | |
| 2005/0244279 A1 * | 11/2005 | Murakami et al. | ................ | 417/222.2 |

FOREIGN PATENT DOCUMENTS

| | | |
|---|---|---|
| JP | 2004-301090 A | 10/2004 |
| JP | 2005-048653 A | 2/2005 |
| JP | 2005-127173 A | 5/2005 |
| JP | 2006-342810 A | 12/2006 |
| JP | 2008-138644 A | 6/2008 |
| JP | 2008-280847 A | 11/2008 |
| JP | 2010-014108 A | 1/2010 |
| JP | 2010-31729 A | 2/2010 |
| JP | 2010-185299 A | 8/2010 |
| KR | 10-2006-0023814 A | 3/2006 |

OTHER PUBLICATIONS

Translation—JP2008280847A Scroll Compressor, Aug. 2014, entire document.*
Translation—JP2006342810A Pressure Regulating Valve Device, Aug. 2014, entire document.*
Translation—JP2010031729A Scroll Compressor, Aug. 2014, entire document.*
Translation JP 2010031729 A, Mar. 12, 2015, specification entire document.*
Extended European Search Report issued Apr. 11, 2013 in corresponding European patent application No. 13151450.7-1608.

* cited by examiner

DIFFERENTIAL PRESSURE REGULATING VALVE AND MOTOR-DRIVEN COMPRESSOR HAVING DIFFERENTIAL PRESSURE REGULATING VALVE

BACKGROUND OF THE INVENTION

The present invention relates to a differential pressure regulating valve and also to a motor-driven compressor having the differential pressure regulating valve.

There has been known a scroll type compressor having a fixed scroll member and a movable scroll member. The fixed scroll member is formed integrally with the housing and has a scroll wall extending from the base plate of the fixed scroll member. The movable scroll member has a scroll wall extending from the base plate of the movable scroll member and is engaged with the fixed scroll member so as to make an orbital motion relative to the fixed scroll member. A fluid pocket as the compression chamber is formed by the scroll walls of the movable scroll member and the fixed scroll member. The volume of the compression chamber is reduced by the orbital movement of the movable scroll member thereby to compress the fluid such as refrigerant gas in the compression chamber. During the compression of refrigerant gas, the movable scroll member receives force acting in the direction that causes the movable scroll member to move away from the fixed scroll member due to compression reaction force of the refrigerant gas. Accordingly, the sealing between the fixed scroll member and the movable scroll member, or between the scroll walls and the base plates of the fixed and the movable scroll members is reduced. To prevent such reduction of the sealing, high-pressure refrigerant gas is introduced into a back pressure chamber which is formed on the back side of the movable scroll member, or on the opposite side of the movable scroll member from the fixed scroll member so that the movable scroll member is urged against the fixed scroll member by the pressure of the high-pressure refrigerant gas thereby to enhance the sealing.

Japanese Patent Application Publication No. 7-229484 discloses a scroll type compressor having a back pressure chamber formed therein so as to have a pressure that is higher than that of a low pressure region of the compressor, or a suction pressure region, and the pressure of the back pressure chamber is adjustable to a predetermined level by a differential pressure regulating valve as the pressure regulating valve. The pressure regulating valve is disposed in a bleed passage which is formed for connecting the back pressure chamber to the low pressure region of the compressor. The pressure regulating valve has a cylindrical valve chamber formed in the bleed passage, a valve hole formed upstream of the valve chamber with respect to the flow of refrigerant gas and forming a part of the bleed passage, a spherical valve body movably accommodated in the valve chamber and an urging spring adapted to urge the valve body in the direction that causes the valve body to close the valve hole. The pressure in the back pressure chamber is applied to the valve body in the direction that causes the valve body to open the valve hole and the pressure in the low pressure region is applied to the valve body in the direction that causes the valve body to close the valve hole. The bleed passage for connecting the downstream region of the valve chamber to the low pressure region extends from the lateral side of the valve chamber or the inner peripheral surface of the cylindrical valve chamber. Thus, when the pressure of the back pressure chamber becomes greater than a predetermined value, the pressure regulating valve opens the bleed passage. Therefore, the pressure of the back pressure chamber is prevented from being excessively increased.

According to the scroll type compressor disclosed in the above Publication, however, when the valve body of the pressure regulating valve opens the valve hole, the refrigerant gas introduced into the valve chamber through the valve hole flows around the valve body while flowing through a space between the peripheral surface of the valve body and the inner peripheral surface of the valve chamber. Then, the refrigerant gas is flowed into the bleed passage which is formed extending from the lateral side of the valve chamber. When the refrigerant gas flows into the bleed passage, an irregular flow of the refrigerant gas occurs in the valve chamber and the valve body is moved or displaced in a direction that is perpendicular to the extension and compression direction of the urging spring, thereby causing a turbulent flow of the refrigerant gas in the valve chamber. As a result, the refrigerant gas is vibrated and abnormal noise is generated, accordingly. When the pressure regulating valve is operated due to a differential pressure across the pressure regulating valve just after the compressor is stopped, noise unpleasant to the user of the compressor is generated.

The present invention is directed to providing a differential pressure regulating valve which prevents irregular flow of fluid occurring in the refrigerant flow when the differential pressure regulating valve is opened and also to a compressor having such differential pressure regulating valve.

SUMMARY OF THE INVENTION

In accordance with the present invention, a differential pressure regulating valve is disposed in a fluid passage for fluid flowing through a compressor. The differential pressure regulating valve includes a valve chamber, a valve hole, a valve body, a support member and an urging member. The valve chamber is formed in the fluid passage and having a cylindrical shape. The valve hole is formed in the fluid passage as an opening which communicates with the valve chamber. The valve body is disposed in the valve chamber and adapted to open and close the valve hole. The support member is fixedly mounted to the valve chamber and extends across flowing direction of the fluid in the valve chamber. The support member has a communication passage for fluid communication between a first valve chamber formed on the valve body side of the support member in the valve chamber and a second valve chamber formed on the opposite side of the support member in the valve chamber. At least a part of the communication passage is opened at uniformly spaced intervals to the outer periphery of the support member on the first valve chamber side. The urging member is disposed between the support member and the valve body for urging the valve body toward the valve hole and is extensible.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
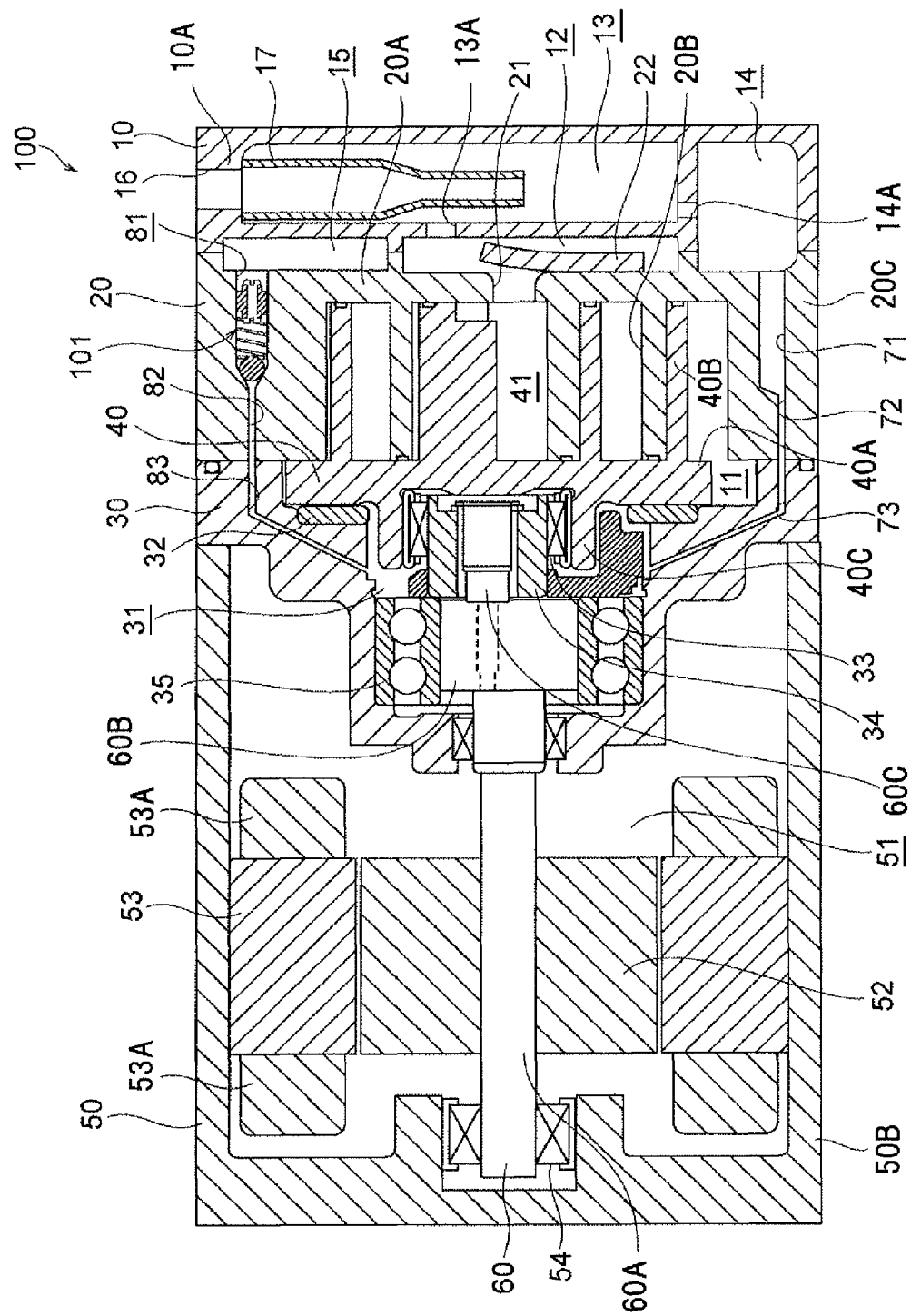
FIG. 1 is a schematic longitudinal sectional view of a compressor having a differential pressure regulating valve according to a first preferred embodiment of the present invention.

The following will describe a differential pressure regulating valve and a compressor having the differential pressure regulating valve according to a first preferred embodiment of the present invention with reference to FIGS. 1 through 4. Referring to FIG. 1, the compressor is designated by referential numeral 100 and includes a differential pressure regulating valve 101. The compressor 100 in the following description is a scroll type motor-driven compressor. The compressor 100 is provided in a refrigerant circuit for compressing a refrigerant gas as fluid.

The compressor 100 has a first housing 10, a second housing 20 forming a fixed scroll member and a third housing 30. The first housing 10 and the third housing 30 are connected integrally to the second housing 20 at the opposite ends thereof by bolts (not shown). The compressor 100 further has a motor housing 50 which is connected integrally to the third housing 30 on the side thereof opposite from the second housing 20.

The second housing 20 has a fixed base plate 20A, a fixed scroll wall 20B and an outer peripheral wall 20C. The fixed scroll wall 20B is formed to extend from the fixed base plate 20A toward the third housing 30 and the outer peripheral wall 20C is formed to extend from the fixed base plate 20A toward the third housing 30 so as to surround the fixed scroll wall 20B. The fixed scroll wall 20B is formed spirally on the fixed base plate 20A. The fixed base plate 20A and the fixed scroll wall 20B serve as the fixed base plate and the fixed scroll wall of the fixed scroll member.

The first housing 10 is mounted to the fixed base plate 20A of the second housing 20 to form therebetween a discharge chamber 12, a first oil chamber 14 and a second oil chamber 15. The first and the second oil chamber 14, 15 store lubricating oil in the compressor 100. An oil separating chamber 13 is formed in the first housing 10 adjacent to the discharge chamber 12 and the first oil chamber 14. The oil separating chamber 13 communicates with the outside of the compressor 100 through a discharge port 16 which is formed through the outer peripheral wall 10A of the first housing 10. An oil separating tube 17 extends in the oil separating chamber 13 from the discharge port 16 and has an intermediate portion that is tapered toward the first oil chamber 14. The discharge chamber 12 communicates with the oil separating chamber 13 through a first hole 13A formed in the first housing 10 so as to face the oil separating tube 17. The oil separating chamber 13 communicates with the first oil chamber 14 through a second hole 14A formed in the first housing 10.

The compressor 100 has a movable scroll member 40 disposed between the second housing 20 and the third housing 30. The movable scroll member 40 includes a base plate 40A and a scroll wall 40B which is formed to extend from the base plate 40A toward the fixed base plate 20A. The scroll wall 40B is formed spirally on the base plate 40A and engaged with the fixed scroll wall 20B of the second housing 20 in a manner known in the art. The scroll wall 40B of the movable scroll member 40 is in contact with the fixed scroll wall 20B of the second housing 20 thereby to form a closed fluid pocket whose volume is variable with orbital motion of the movable scroll member 40 and which serves as a compression chamber 41 of the compressor 100.

A suction chamber 11 is formed by the movable scroll member 40 and the third housing 30 at a position adjacent to the base plate 40A. The compression chamber 41 is communicable with the suction chamber 11 at a position adjacent to the outer peripheral wall 20C of the second housing 20 and communicable with the discharge chamber 12 through a discharge port 21 which is formed through the fixed base plate 20A of the second housing 20 at the center thereof. The discharge port 21 is opened and closed by a discharge valve 22 which has a plate shape and is secured to the fixed base plate 20A on the side of the discharge chamber 12. The suction chamber 11 communicates with the outside of the compressor 100 through a suction port (not shown) and communicates with the second oil chamber 15 through a refrigerant passage (not shown) and a lubricating oil passage (not shown). Therefore, the pressure of the second oil chamber 15 is low as well as the pressure of the suction chamber 11. The movable scroll member 40 includes a shaft support portion 40C formed integrally with the base plate 40A so as to extend from the base plate 40A on the opposite side of the base plate 40A from the scroll wall 40B.

The compressor 100 has a drive shaft 60 which is disposed adjacent to the shaft support portion 40C of the movable scroll member 40 or extends centrally in the motor housing 50 of the compressor 100. The drive shaft 60 includes a main shaft portion 60A, a large-diameter portion 60B and a crank pin 60C which are formed integrally into the drive shaft 60. The crank pin 60C of the drive shaft 60 is disposed in the shaft support portion 40C. The large-diameter portion 60B has a larger diameter than the crank pin 60C. The main shaft portion 60A extends from the large-diameter portion 60B from the side thereof opposite from the crank pin 60C. The crank pin 60C is eccentrically disposed relative to the main shaft portion 60A and the large-diameter portion 60B which have the same center axis. In other words, the drive shaft 60 has the different center axis from the main shaft portion 60A and the large-diameter portion 60B. The crank pin 60C is rotatably fitted in the shaft support portion 40C through a bush 34 and a bearing 33 which is disposed outside of the bush 34.

With the rotation of the drive shaft 60, the crank pin 60C is revolved around the rotation axis of the main shaft portion 60A and the large-diameter portion 60B or the drive shaft 60. Therefore, when the main shaft portion 60A or the drive shaft 60 is driven to rotate, the movable scroll member 40 orbits around the rotation axis of the main shaft portion 60A and the large-diameter portion 60B or the drive shaft 60. The compression chamber 41 formed on the suction chamber 11 side is reduced in volume while moving toward the discharge port 21 of the fixed base plate 20A with the orbital motion of the movable scroll member 40, so that the refrigerant gas in the compression chamber 41 is compressed.

The third housing 30 is connected to the second housing 20 so as to cover the movable scroll member 40 and the large-diameter portion 60B and the crank pin 60C of the drive shaft 60 from the side of the shaft support portion 40C. The third housing 30 rotatably supports the large-diameter portion 60B through a bearing 35 and the main shaft portion 60A of the drive shaft 60 extends through the third housing 30. The third hosing 30 supports the movable scroll member 40 in a direction of the axis of the drive shaft 60 through a bush 32 disposed between the third housing 30 and the base plate 40A of the movable scroll member 40.

A back pressure chamber 31 is formed in the third housing 30 on the side of the base plate 40A of the movable scroll member 40 from where the shaft support portion 40C extends. First and second supply passages 71, 72 are formed in the second housing 20 and a third supply passage 73 is formed in the third housing 30. The back pressure chamber 31 communicates with the first oil chamber 14 through the third supply passage 73 and the first and the second supply passages 71, 72. The second and the third supply passages 72, 73 have an inner diameter that is substantially smaller than that of the first supply passage 71. Thus, the flow of high-pressure refrigerant gas in the first oil chamber 14 introduced from the discharge chamber 12 is throttled by the second and the third supply passages 72, 73 and refrigerant gas of an increased pressure is flowed into the back pressure chamber 31. The high-pressure refrigerant gas in the back pressure chamber 31 urges the movable scroll member 40 against the second housing 20 which serves as the fixed scroll member, so that the sealing between the scroll wall 40B and the base plate 40A of the movable scroll member 40 and the fixed scroll wall 20B and the fixed base plate 20A of the fixed scroll member is enhanced.

A second bleed passage 83 is formed in the third housing 30 and a first bleed passage 82 is formed in the second housing 20 in direct communication with the second bleed passage 83. The back pressure chamber 31 is communicable with the second oil chamber 15 through the second bleed passage 83 and the first bleed passage 82. A cylindrical valve chamber 81 is formed in the first bleed passage 82 at the end thereof formed with an enlarged diameter at a position adjacent to the second oil chamber 15. A differential pressure regulating valve 101 is disposed in the valve chamber 81. The first bleed passage 82 forms a part of a fluid passage.

The communication between the first bleed passage 82 and the second oil chamber 15 is normally shut off by the differential pressure regulating valve 101. The differential pressure regulating valve 101 is actuated in response to the differential pressure between the pressure in the back pressure chamber 31 and the pressure in the second oil chamber 15. The differential pressure regulating valve 101 allows refrigerant gas to flow therethrough in one direction from the first bleed passage 82 to the second oil chamber 15, but blocks the flow in the opposite direction from the second oil chamber 15 to the first bleed passage 82. Thus, the differential pressure regulating valve 101 serves as a check valve which is controlled due to the differential pressure. If the pressure of refrigerant gas in the back pressure chamber 31 is increased to reach a predetermined value, the differential pressure regulating valve 101 is opened thereby to allow refrigerant gas in the back pressure chamber 31 to flow into the second oil chamber 15. If the volume of the lubricating oil flowed into the back pressure chamber 31 from the first oil chamber 14 with the refrigerant gas becomes excessive, the pressure in the back pressure chamber 31 is increased to open the differential pressure regulating valve 101, thereby allowing the lubricating oil to flow into the second oil chamber 15 with the refrigerant gas.

The motor housing 50 has formed therein a motor chamber 51. The main shaft portion 60A of the drive shaft 60 is rotatably supported in the motor housing 50 by a bearing 54. In the motor chamber 51, a rotor 52 is fixedly mounted on the main shaft portion 60A for rotation therewith. A stator 53 having a coil 53A is fixed to the inner surface of the outer wall 50B of the motor housing 50 so as to surround the rotor 52. When an electric current flows through the coil 53A, the rotor 52 is driven thereby to rotate the main shaft portion 60A or the drive shaft 60.

With the rotation of the drive shaft 60, the crank pin 60C is driven to revolve and the movable scroll member 40 fitted in the shaft support portion 40C is driven to make an orbital motion around the rotation axis of the large-diameter portion 60B and the main shaft portion 60A. The crank pin 60C performing the orbital motion and the movable scroll member 40 fitted to the shaft support portion 40C are driven to orbit around the rotation axis of the main shaft portion 60A.

Accordingly, the compression chamber 41 formed between the scroll wall 40B of the movable scroll member 40 and the fixed scroll wall 20B of the second housing 20 is moved toward the center of the fixed and the movable scroll members 20, 40 while reducing its volume. During the process of forming the compression chamber 41 and reducing the volume of the compression chamber 41, refrigerant gas is flowed from the suction chamber 11 into the compression chamber 41 together with lubricating oil. Then, the refrigerant gas containing lubricating oil is compressed in the compression chamber 41, flowed through the discharge port 21 and into the discharge chamber 12. In this process, the lubricating oil contained in the refrigerant gas lubricates the sliding parts between the movable scroll member 40 and the second housing 20 (the fixed scroll member).

The refrigerant gas in the discharge chamber 12 is flowed into the oil separating chamber 13. In the oil separating chamber 13, the refrigerant gas is flowed toward the lower end of the oil separating tube 17 while swirling around the tapered portion of the oil separating tube 17 and is flowed to the distal end of the oil separating tube 17. Then, the refrigerant gas is flowed into the oil separating tube 17 and delivered out of the compressor 100 through the discharge port 16. The lubricating oil contained in the refrigerant gas is separated from the refrigerant gas by centrifugal force while swirling around the oil separating tube 17 and the separated lubricating oil is flowed into the first oil chamber 14 through the second hole 14A.

Part of the high-pressure refrigerant gas in the oil separating chamber 13 is flowed into the first oil chamber 14, from where the refrigerant gas is flowed into the back pressure chamber 31 through the supply passages 71, 72, 73. Then, the high-pressure refrigerant gas in the back pressure chamber 31 urges the movable scroll member 40 against the second housing 20 and supplies the lubricating oil to the sliding parts in the back pressure chamber 31. When the differential pressure between the pressures of the refrigerant gas in the back pressure chamber 31 and in the second oil chamber 15 or the suction chamber 11 becomes larger than the predetermined value, the differential pressure regulating valve 101 is opened to allow the refrigerant gas containing the lubricating oil in the back pressure chamber 31 to flow into the second oil chamber 15. This protects the parts in the back pressure chamber 31 from application of any excessively high pressure. The refrigerant gas flowed in the second oil chamber 15 impinges against the inner surface of the second oil chamber 15, so that the lubricating oil is removed from the refrigerant gas. The refrigerant gas is flowed into the suction chamber 11 due to suction force generated in the suction chamber 11. The lubricating oil in the second oil chamber 15 is also flowed into the suction chamber 11 due to the suction force generated in the suction chamber 11. The refrigerant gas flowed into the suction chamber 11 through a suction port (not shown) contains lubricating oil and the refrigerant gas is flowed into the compression chamber 41 together with the lubricating oil.

Figure 2:
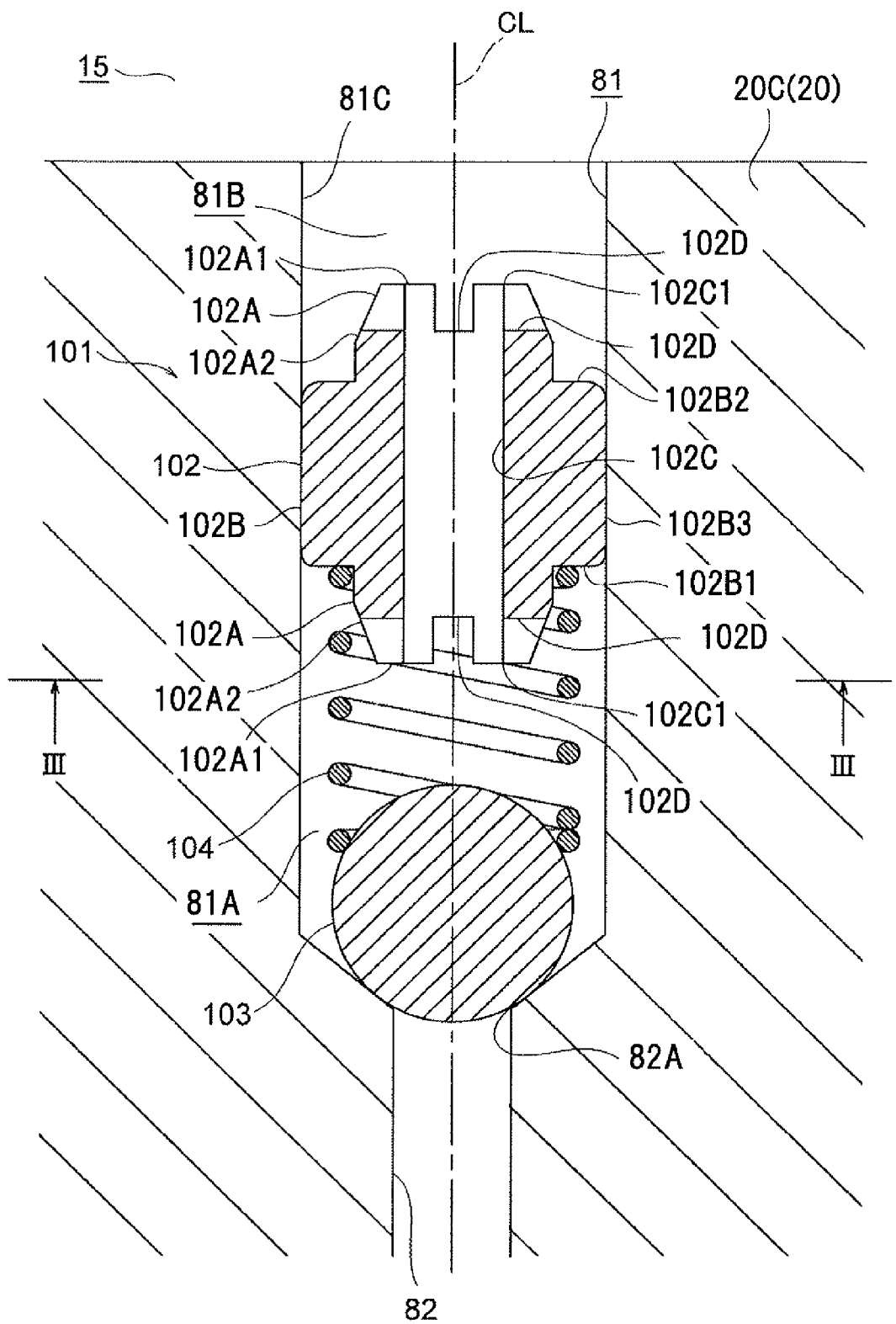
FIG. 2 is a schematic enlarged sectional view of the differential pressure regulating valve of FIG. 1.
Figure 3:
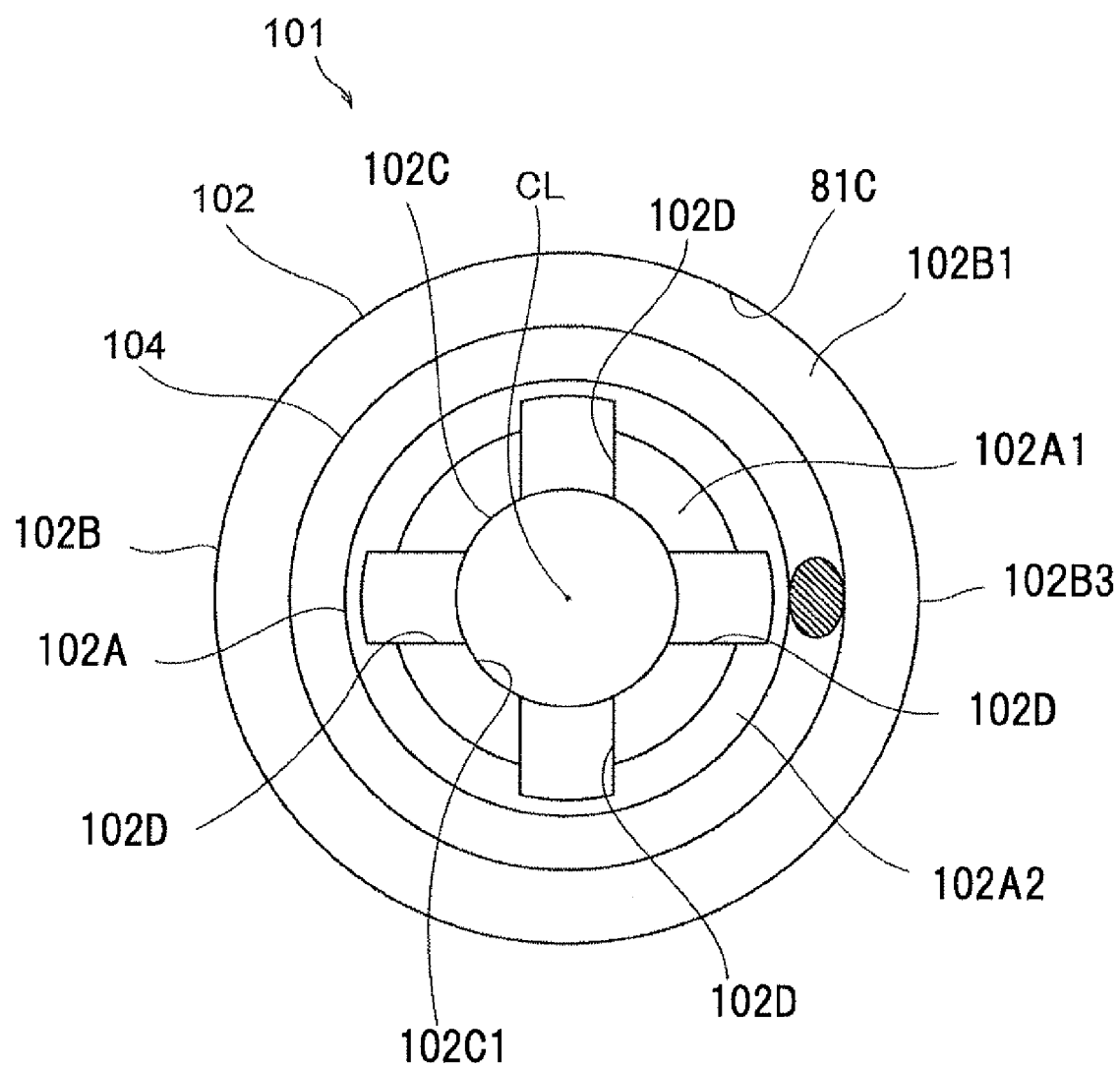
FIG. 3 is a schematic sectional view taken along the line III-III of FIG. 2.

The differential pressure regulating valve 101 is shown in FIGS. 2 and 3 in detail. The differential pressure regulating valve 101 includes a support member 102 fixedly mounted in the cylindrical valve chamber 81. The support member 102 includes a cylindrical main body 102B having an outer peripheral surface 102B3 and fitted in the valve chamber 81 having an inner peripheral surface 81C. The cylindrical main body 102B of the support member 102 has opposite end surfaces 102B1, 102B2 of the cylindrical main body 102B. The support member 102 further includes two cylindrical projections 102A which projects from the opposite end surfaces 102B1, 102B2 of the main body 102B, respectively. Each projection 102A extends in the direction of the center axis CL of the cylindrical valve chamber 81 which corresponds to the extending direction of the valve chamber 81. As viewed in transverse section of the valve chamber 81, each projection 102A is positioned centrally of the transverse section of the valve chamber 81 which is perpendicular to the extending direction of the valve chamber 81 from a valve hole 82A toward the support member 102. The main body 102B and the projections 102A are concentric with the valve chamber 81 about the center axis CL. Each projection 102A has a smaller diameter than the main body 102B so that a gap is formed between the projection 102A and the inner peripheral surface 81C of the valve chamber 81.

The valve chamber 81 is divided by the main body 102B of the support member 102 into two spaces on opposite side of the main body 102B, namely a first valve chamber 81A located on the first bleed passage 82 side and a second valve chamber 81B on the second oil chamber 15 side.

The support member 102 has formed therethrough an axial hole 102C extending between the end surface 102A1 of one projection 102A to the end surface 102A1 of the other projection 102A. The axial hole 102C has a circular cross section and formed concentric with the valve chamber 81 having the center axis which corresponds to the center axis CL of the valve chamber 81. The axial hole 102C has at the ends thereof opposite circular openings 102C1. The two openings 102C1 are formed at the end surfaces 102A1 of the projections 102A at the center of the end surfaces 102A1, respectively. As shown in FIG. 3, each end surface 102A1 of the projection 102A has four recesses 102D extending radially of the cylindrical projection 102A from the opening 102C1 in a crisscross manner. Each recess 102D is opened at a side portion 102A2 of the projection 102A and is opened at uniformly spaced intervals to the outer periphery of the support member 102. Thus, the first valve chamber 81A and the second valve chamber 81B which are located on opposites sides of the support member 102 communicates with each other through the recesses 102D and the axial hole 102C. According to the first preferred embodiment of the present invention, the side portion 102A2 of the projection 102A is tapered toward the distal end of the projection 102A. Alternatively, the side portion 102A2 of the projection 102A may not be tapered to the distal end of the projection 102A. The axial hole 102C and the recesses 102D form a communication passage.

The support member 102 may be installed in place by being pushed into the valve chamber 81 and securely fixed to the inner peripheral surface 81C of the valve chamber 81.

The differential pressure regulating valve 101 further includes a spherical valve body 103 movably disposed between the support member 102 and the first bleed passage 82 and a coil spring 104 disposed between the support member 102 and the valve body 103 in the first valve chamber 81A of the valve chamber 81. The coil spring 104 serves as an urging member. The coil spring 104 is disposed in such a way that one end thereof surrounds the projection 102A of the support member 102 and is in pressing contact with the end surface 102B1 of the main body 102B and the other end thereof is in pressing contact with the valve body 103. The valve body 103 is urged by the coil spring 104 toward the valve hole 82A of the first bleed passage 82 which serves as an opening which communicates between the first bleed passage 82 and the valve chamber 81. When the valve body 103 receives only the urging force of the coil spring 104, the valve body 103 closes the valve hole 82A, as shown in FIG. 2. The diameters of the spherical valve body 103 and the coil spring 104 are smaller than the transverse section of the valve chamber 81 so that a gap is formed between the inner peripheral surface 81C of the valve chamber 81 and the valve body 103 and the coil spring 104, respectively. When the valve body 103 is in contact with the end surface 102A1 of the projection 102A of the support member 102, the axial hole 102C of the support member 102 communicates with the first valve chamber 81A through the recesses 102D from the side of the projection 102A. The end surface 102A1 of the projection 102A forms a contacting portion.

The pressure of the refrigerant gas in the back pressure chamber 31 is applied to the valve body 103 from the first bleed passage 82 side and the pressure of the refrigerant gas in the second oil chamber 15 or the suction chamber 11 is applied to the valve body 103 through the axial hole 102C from the opposite side. When the urging force of the pressure of the refrigerant gas acting on the valve body 103 from the first bleed passage 82 side is greater than the sum of the urging force of the pressure of the refrigerant gas and the urging force of the coil spring 104 acting on the valve body 103 from the second oil chamber 15 side, the valve body 103 closing the valve hole 82A is moved toward the support member 102 and opens the valve hole 82A. Therefore, the refrigerant gas in the first bleed passage 82 or the back pressure chamber 31 is allowed into the first valve chamber 81A of the valve chamber 81 while flowing through the gap between the peripheral surface of the valve body 103 and the inner peripheral surface 81C of the first valve chamber 81A and then flowed into the axial hole 102C. Then, the refrigerant gas is flowed from the axial hole 102C into the second oil chamber 15 through the second valve chamber 81B.

When the pressure of the refrigerant gas in the back pressure chamber 31 is substantially high, the valve body 103 is moved until the valve body 103 is brought into contact with the projection 102A of the support member 102.

Figure 4:
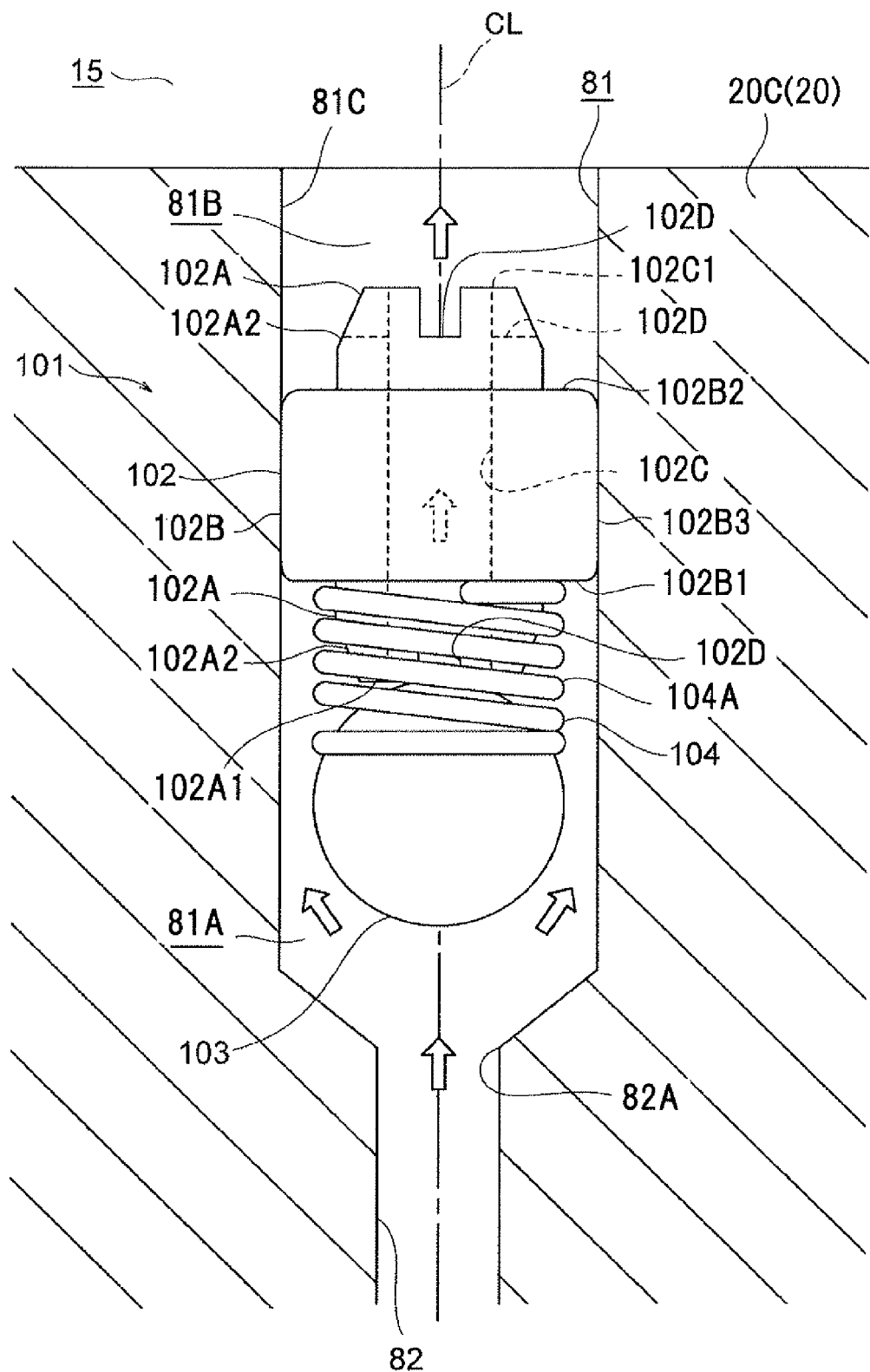
FIG. 4 is a schematic sectional view of the differential pressure regulating valve of FIG. 2 when the differential pressure regulating valve is opened.

FIG. 4 is a schematic sectional view of the differential pressure regulating valve 101 showing a state that the valve body 103 is in contact with the projection 102A of the support member 102. In this state, the coil spring 104 is compressed in the direction of the center axis CL to such an extent that a clearance is formed between any two adjacent turns of the spiral portion 104A of the coil spring 104. That is, the coil spring 104 is not compressed completely when the valve body 103 is made to be in contact with the projection 102A of the support member 102. The refrigerant gas in the first bleed passage 82 is flowed into the first valve chamber 81A of the valve chamber 81 and then inside the coil spring 104 through the clearance in the spiral portion 104A of the coil spring 104. The refrigerant gas is flowed into the axial hole 102C through the recesses 102D in the projection 102A of the support member 102 and then into the second valve chamber 81B.

In the differential pressure regulating valve 101, the refrigerant gas flowed into the first valve chamber 81A from the back pressure chamber 31 when the differential pressure regulating valve 101 is opened is flowed around the valve body 103 and then into the axial hole 102C having the center axis corresponding to the center axis CL of the support member 102 and the valve chamber 81 through the criss-cross recesses 102D that extend radially and at uniformly spaced intervals. Thus, the refrigerant gas is flowed uniformly around the valve body 103 into the axial hole 102C. Therefore, the valve body 103 is prevented from being moved or displaced laterally with respect to the center axis CL of the valve chamber 81, with the result that irregular flow of the refrigerant gas is suppressed and hence abnormal noise generated by any irregular flow of the refrigerant gas through the differential pressure regulating valve 101 is suppressed.

The differential pressure regulating valve 101 is disposed in the first bleed passage 82 of the compressor 100. The differential pressure regulating valve 101 includes the support member 102, the valve body 103 and the coil spring 104. The support member 102 is fitted in the cylindrical valve chamber 81 formed in the first bleed passage 82 and extends across the flowing direction of the refrigerant gas in the valve chamber 81. The valve body 103 is movable between the opened position where the valve hole 82A is opened for fluid communication between the valve chamber 81 and the first bleed passage 82 and the closed position where the valve hole 82A is closed thereby to block the fluid communication. The coil spring 104 is disposed between the support member 102 and the valve body 103 for urging the valve body 103 toward the valve hole 82A. The support member 102 has formed therein the axial hole 102C and the recesses 102D as the communication passage for fluid communication between the first valve chamber 81A formed on the valve body 103 side of the support member 102 and the opposite side of the support member 102 in the valve chamber 81. The axial hole 102C and the recesses 102D are opened at uniformly spaced intervals to the outer periphery of the support member 102 on the first valve chamber 81A side.

The valve body 103 of the differential pressure regulating valve 101 normally closes the valve hole 82A by the urging force of the coil spring 104. When the urging force of the pressure of the refrigerant gas in the first bleed passage 82 acting on the valve body 103 becomes greater than the sum of the urging force of the coil spring 104 and the force of the pressure of the refrigerant gas acting on the valve body 103 from the coil spring 104 side, the valve body 103 is moved to open the valve hole 82A. Accordingly, the refrigerant gas is flowed into the first valve chamber 81A of the valve chamber 81 through the valve hole 82A and then into the axial hole 102C formed in the support member 102 which extends across the flowing direction of the refrigerant gas in the valve chamber 81. The axial hole 102C and the recesses 102D of the support member 102 are opened at uniformly spaced intervals to the outer periphery of the support member 102 on the first valve chamber 81A side of the support member 102 where the valve body 103 is provided. Thus, the refrigerant gas is distributed uniformly in the first valve chamber 81A and flowed into the recesses 102D and the axial hole 102C. Therefore, the valve body 103 is prevented from being displaced laterally by the flowing refrigerant gas with respect to the extension and compression direction of the coil spring 104 or the center axis CL, so that irregular fluid flow of the refrigerant gas is suppressed and the generation of abnormal fluid noise of the refrigerant gas is also suppressed.

The support member 102 of the differential pressure regulating valve 101 has the projection 102A which extends in the same direction as the extension and compression direction of the coil spring 104 and with which the valve body 103 is contactable when the coil spring 104 is compressed. The axial hole 102C has the opening 102C1 at the center of the end surface 102A1 which serves as the contacting portion with which the valve body 103 is contactable. When the valve body 103 is in contact with the end surface 102A1 of the projection 102A, the refrigerant gas is allowed to flow into the axial hole 102C through the recesses 102D. The recesses 102D which are formed at uniformly spaced intervals allows the refrigerant gas to be distributed and to flow into the recesses 102D uniformly.

The coil spring 104 of the differential pressure regulating valve 101 surrounds the projection 102A and the coil spring 104 is compressed to such an extent that a clearance is formed between any two adjacent turns of the spiral portion 104A of the coil spring 104 when the valve body 103 is moved into contact with the support member 102. With the valve body 103 placed in contact with the support member 102, the refrigerant gas is allowed to flow into the axial hole 102C through the clearance in the coil spring 104.

In the differential pressure regulating valve 101, the projection 102A of the support member 102 is positioned centrally of the valve chamber 81 as seen in transverse section perpendicular to the extending direction of the valve chamber 81 from the valve hole 82A to the support member 102 or across the center axis CL. Thus, the axial hole 102C is positioned concentric with the cylindrical valve chamber 81, so that flow of the refrigerant gas is distributed uniformly between the valve body 103 and the inner peripheral surface 81C of the valve chamber 81.

The valve body 103 of the differential pressure regulating valve 101 has a spherical shape and there is a clearance between the valve body 103 and the inner peripheral surface 81C of the valve chamber 81. When the valve body 103 pushes to compress the coil spring 104 thereby to open the valve hole 82A, the refrigerant gas flowed through the valve hole 82A flows smoothly and uniformly between the valve body 103 and the inner peripheral surface 81C of the valve chamber 81 without causing any turbulent flow of the refrigerant gas. The support member 102 has two projections 102A which extend from the opposite end surfaces 102B1, 102B2 of the main body 102B, respectively. The axial hole 102C is formed through the support member 102 so as to be opened at the opposite end surfaces 102A1 of the projections 102A and the recesses 102D are formed in the opposite projections 102A. The support member 102 may be installed in the valve chamber 81 by inserting either of the opposite projections 102A into the valve chamber 81 which is advantageous in the assembling of the differential pressure regulating valve 101 and hence in reduction of the manufacturing cost.

Figure 5:
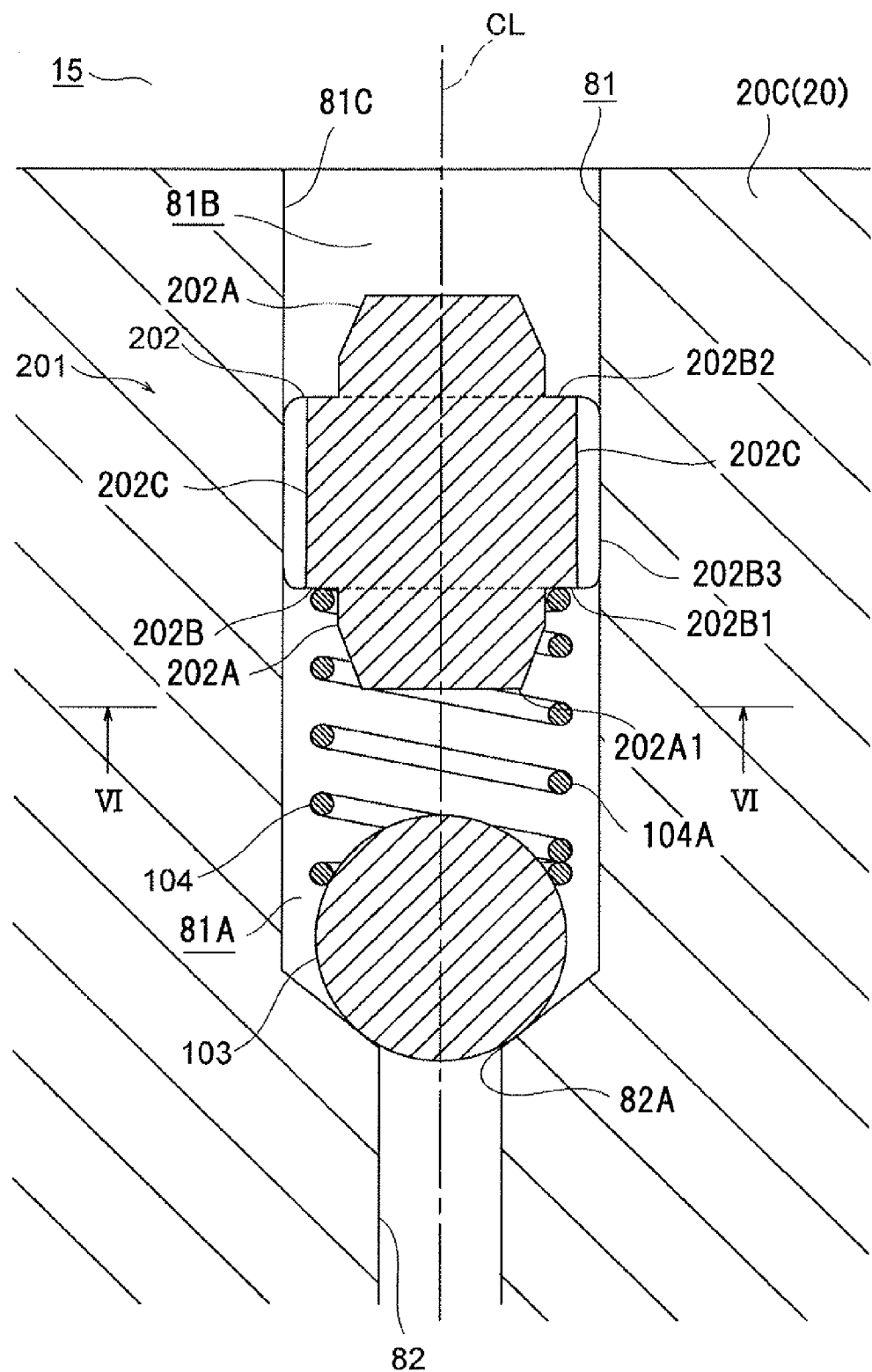
FIG. 5 is a schematic sectional view of a differential pressure regulating valve according to a second preferred embodiment of the present invention.
Figure 6:
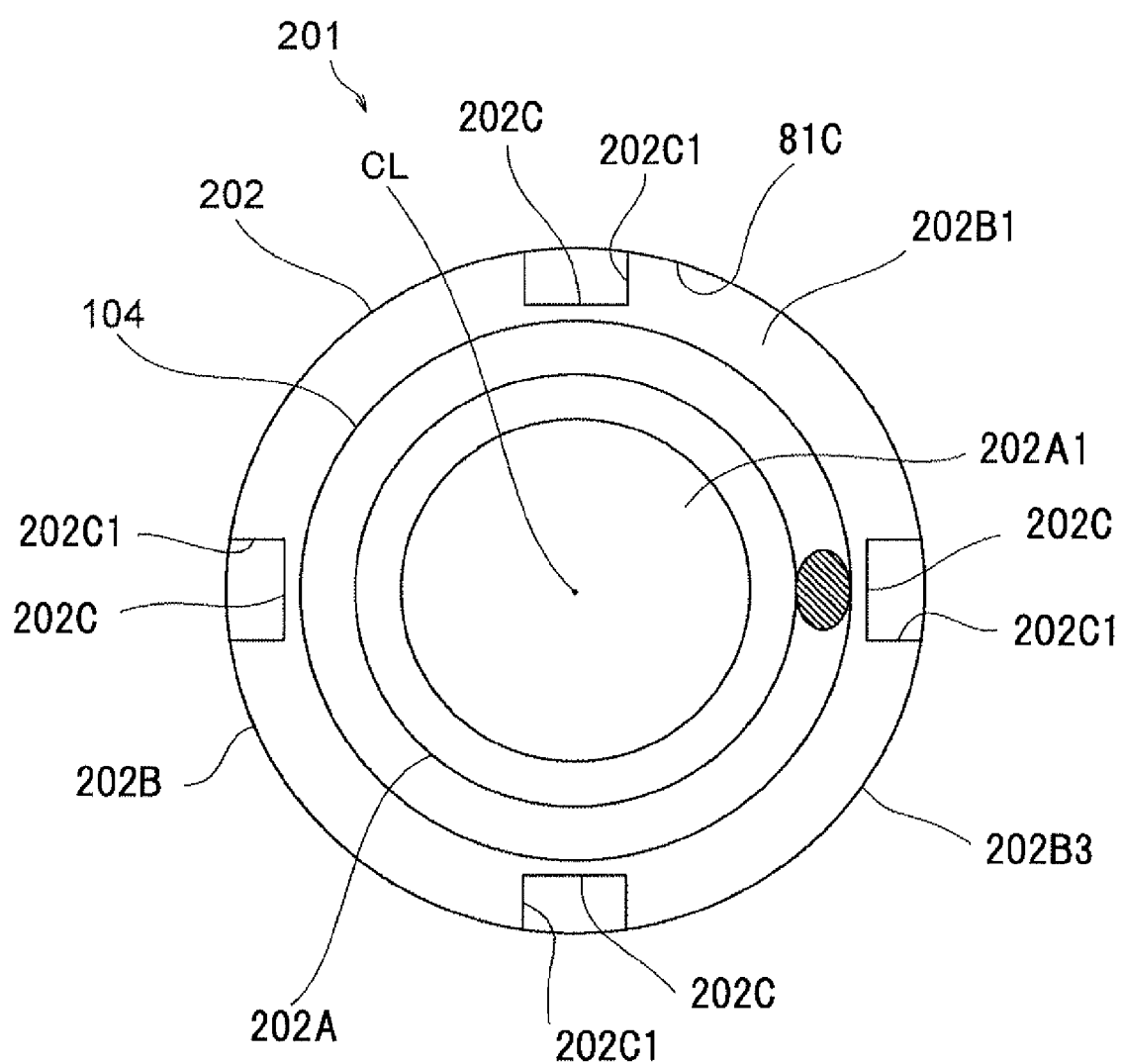
FIG. 6 is a schematic sectional view taken along the line VI-VI of FIG. 5.

The following will describe a differential pressure regulating valve 201 according to a second preferred embodiment of the present invention with reference to FIGS. 5 and 6. The second preferred embodiment differs from the first preferred embodiment in that the axial hole 102C of the differential pressure regulating valve 101 formed in the center of the projection 102A of the support member 102 is dispensed with and a plurality of grooves 202C is formed in the outer peripheral surface 202B3 of the main body 202B of the support member 202. In the following description, the same reference numerals will be used for the common elements or components in the first and the second embodiments, and the description of such elements or components will be omitted.

Referring to FIGS. 5 and 6, the support member 202 of the differential pressure regulating valve 201 of the second preferred embodiment is fitted to the inner peripheral surface 81C of the valve chamber 81 as in the case of the differential pressure regulating valve 101 of the first preferred embodiment. The support member 202 includes the cylindrical main body 202B and two cylindrical projections 202A. The main body 202B has opposite end surfaces 202B1, 202B2 and an outer peripheral surface 202B3 which is fitted in contact with its complementary inner peripheral surface 81C of the valve chamber 81. The projections 202A project from the opposite end surfaces 202B1, 202B2 of the main body 202B, respectively.

The support member 202 has formed therein four longitudinal grooves 202C each having the same shape and extending along the center axis CL between the end surface 202B1 and the end surface 202B2 of the main body 202B. The four longitudinal grooves 202C are formed in the outer peripheral surface 202B3 with a rectangular cross-section and opened at uniformly spaced intervals. The grooves 202C serves as a communication passage for communication between the first valve chamber 81A and the second valve chamber 81B. Each of the end surfaces 202B1, 202B2 of the main body 202B has four openings 202C1 of the grooves 202C. The openings 202C1 are formed to have the same shape and opened at uniformly spaced intervals. The differential pressure regulating valve 201 has the valve body 103 and the coil spring 104 which are disposed in the first valve chamber 81A of the valve chamber 81 as in the case of the differential pressure regulating valve 101 of the first preferred embodiment.

When the urging force of the pressure of the refrigerant gas on the first bleed passage 82 side acting on the valve body 103 becomes greater than the sum of the urging forces of the pressure of the refrigerant gas on the second oil chamber 15 side and of the coil spring 104, the valve body 103 is moved to open the valve hole 82A. Thus, the refrigerant gas in the first bleed passage 82 is introduced into the first valve chamber 81A of the valve chamber 81 and flowed along the inner peripheral surface 81C of the valve chamber 81, and around the periphery of the valve body 103 and into the grooves 202C. Then, the refrigerant gas is flowed into the second oil chamber 15 through the second valve chamber 81B.

The refrigerant gas flowed around the valve body 103 when the differential pressure regulating valve 201 is opened is flowed directly into the longitudinal grooves 202C which are formed in the outer peripheral surface 202B3 of the main body 202B of the support member 202 and opened at uniformly spaced intervals, so that the refrigerant gas is distributed and flowed uniformly around the valve body 103. Thus, the valve body 103 is prevented from being moved or displaced in a direction perpendicular to the extension and compression direction of the coil spring 104 or laterally with respect to the center axis CL, so that irregular fluid of the refrigerant gas is also prevented and, therefore, the generation of any abnormal noise by irregular refrigerant flow in the differential pressure regulating valve 201 is also prevented.

According to the second preferred embodiment, the refrigerant gas is flowed outside of the coil spring 104. The coil spring 104 may be configured such that the spiral portions 104A thereof are made contact with each other or, alternatively, spaced apart from one another thereby to form gaps therebetween, when the valve body 103 is moved into contact with the end surface 202A1 of the projection 202A of the support member 202. The rest of the structure of differential pressure regulating valve 201 according to the second preferred embodiment is substantially the same as that of the first preferred embodiment, and the description thereof will be omitted. The differential pressure regulating valve 201 of the second preferred embodiment offers substantially the same effects as the differential pressure regulating valve 101 of the first preferred embodiment.

According to the first and the second preferred embodiments, the differential pressure regulating valves 101, 201 are provided in the first bleed passage 82 which provides fluid communication between the back pressure chamber 31 and the second oil chamber 15 on the suction side in the scroll type motor-driven compressor. Alternatively, the differential pressure regulating valves 101, 201 may be provided in any part of the compressor where the flow of refrigerant gas needs to be controlled according to the pressure differential. Further, the compressor having the differential pressure regulating valve 101, 201 is not limited to a scroll type compressor, but may be of a vane type. According to the differential pressure regulating valves 101, 201 of the first and the second preferred embodiments, the valve body 103 has a spherical shape. The valve body 103 is not limited to have a such shape, but may have a conical shape or cylindrical shape having at the distal end thereof a spherical surface, a conical surface or a truncated conical surface.

According to the differential pressure regulating valves 101, 201 of the first and the second preferred embodiments, the valve chamber 81 has a cylindrical shape. The valve chamber 81 is not limited to have a such shape, but may have an elliptic cylindrical shape or a cylindrical shape having a polygonal cross section. According to the differential pressure regulating valve 101 of the first preferred embodiment, the axial hole 102C and the opening 102C1 have a circular cross section. The axial hole 102C and the opening 102C1 are not limited to have a such cross section, but the opening 102C1 may have any cross sectional shape such as polygonal shape as long as the recesses are opened at uniformly spaced intervals to the inner peripheral surface 81C of the valve chamber 81.

According to the differential pressure regulating valve 201 of the second preferred embodiment, the radial groove 202C and the opening 202C1 have a rectangular cross section. The radial groove 202C and the opening 202C1 are not limited to have a such cross section, but may be have any other suitable shape such as a circular or polygonal cross section. Further, four radial grooves 202C and the openings 202C1 may have the same shape. Four radial grooves 202C and the openings 202C1 may have any shape as long as the openings 202C1 are opened at uniformly spaced intervals to the inner peripheral surface 81C of the valve chamber 81. The number of the radial grooves 202C is not limited to four, but may be three, or five or more. According to the differential pressure regulating valve 101 of the first preferred embodiment, the recesses 102D may be formed such that the opening areas thereof are formed uniformly toward the inner peripheral surface 81C of the valve chamber 81. The number of the recesses 102D is not limited to four, but may be three, or five or more. According to the first and the second preferred embodiments, the differential pressure regulating valves 101, 201 have the support members 102, 202 each have two opposite projections 102A, 202A, respectively. The projection 102A, 202A formed on the side of the support member 102, 202 that is opposite from the valve body 103 side may be omitted.

What is claimed is:

1. A differential pressure regulating valve disposed in a fluid passage for fluid flowing through a compressor, the differential pressure regulating valve comprising:

a valve chamber formed in the fluid passage and having a cylindrical shape;

a valve hole formed in the fluid passage as an opening which communicates with the valve chamber;

a spherical valve body disposed in the valve chamber and adapted to open and close the valve hole;

a support member that includes a contacting portion and a communication passage including an axial hole and a plurality of recesses, is fixedly mounted to the valve chamber, and extends across flowing direction of the fluid in the valve chamber such that the support member restricts the flow of the fluid; and an extensible urging member for urging the valve body toward the valve hole, the urging member being disposed between the support member and the valve body in such a way that one end of the urging member is in contact with an outer peripheral portion of the support member at a position that is radially outward of the axial hole and the contacting portion and the other end of the urging member is in contact with the valve body, wherein the contacting portion is contactable with the valve body when the urging member is compressed, and wherein the axial hole extends between a first valve chamber formed on the valve body side of the support member in the valve chamber and a second valve chamber formed on the opposite side of the support member in the valve chamber and has a first opening that is opened in the first valve chamber and a second opening that is opened in the second valve chamber, and wherein the plurality of recesses extends radially from each of the first opening and the second opening, the axial hole being formed concentric with the valve hole, and the first opening being located at the contacting portion.

2. The differential pressure regulating valve according to claim 1, wherein the support member has a projection which extends in the same direction as the extension and compression direction of the urging member and with which the valve body is contactable when the urging member is compressed, the contacting portion is an end of the projection, and the first opening of the axial hole is opened at the center of the contacting portion.

3. The differential pressure regulating valve according to claim 2, wherein the urging member is a coil spring surrounding the projection and the coil spring is compressed to such an extent that a clearance is formed between any two adjacent turns of the coil spring when the valve body is moved into contact with the support member.

4. The differential pressure regulating valve according to claim 2, wherein the projection is positioned centrally of the valve chamber as seen in transverse section perpendicular to the extending direction of the valve chamber from the valve hole to the support member.

5. The differential pressure regulating valve according to claim 1, wherein the support member has a projection which extends in the same direction as the extension and compression direction of the urging member and with which the valve body is contactable when the urging member is compressed, the communication passage has a plurality of grooves formed as open recesses in an outer peripheral surface of the support member at uniformly spaced intervals.

6. The differential pressure regulating valve according to claim 5, wherein the urging member is a coil spring surrounding the projection and the coil spring is compressed to such an extent that a clearance is formed between any two adjacent turns of the coil spring when the valve body is moved into contact with the support member.

7. The differential pressure regulating valve according to claim 5, wherein the projection is positioned centrally of the valve chamber as seen in transverse section perpendicular to the extending direction of the valve chamber from the valve hole to the support member.

8. The differential pressure regulating valve according to claim 1, wherein there is a clearance between the valve body and an inner peripheral surface of the valve chamber.

9. The differential pressure regulating valve according to claim 1, wherein the compressor is a scroll type motor-driven compressor having a movable scroll member, the differential pressure regulating valve is disposed in a bleed passage formed for connecting a back pressure chamber positioned on the side of the back surface of the movable scroll member to a region on a suction side of the scroll type motor-driven compressor.

10. A motor-driven compressor comprising:
a differential pressure regulating valve disposed in a fluid passage for fluid flowing through a compressor,
the differential pressure regulating valve comprising:
a value chamber formed in the fluid passage and having a cylindrical shape;
a valve hole formed in the fluid passage as an opening which communicates with the valve chamber:
a spherical valve body disposed in the valve chamber and adapted to open and close the valve hole;
a support member that includes a contacting portion and a communication passage including an axial hole and a plurality of recesses, is fixedly mounted to the valve chamber, and extends across flowing direction of the fluid in the valve chamber such that the support member restricts the flow of the fluid: and
an extensible urging member for urging the valve body toward the valve hole, the urging member being disposed between the support member and the value body in such a way that one end of the urging member is in contact with an outer peripheral portion of the support member at a position that is radially outward of the axial hole and the contacting portion and the other end of the urging member is in contact with the valve body, wherein the contacting portion is contactable with the valve body when the member is compressed, and wherein the axial hole extends between a first valve chamber formed on the valve body side of the support member in the valve chamber and a second valve chamber formed on the opposite side of the support member in the valve chamber and has a first opening that is opened in the first value chamber and a second opening that is opened in the second value chamber, and wherein the plurality of recesses extends radially from each of the first opening and the second opening, the axial hole being formed concentric with the valve hole, and the first opening being located at the contacting portion.

11. The motor-driven compressor according to claim 10, wherein:

the support member has projection which extends in the same direction as the extension and compression direction of the urging member and with which the valve body is contactable when the urging member is compressed, the contacting portion is an end of the projection, and the first opening of the axial hole is opened at the center of the contacting portion.

12. The motor-driven compressor according to claim 11, wherein the urging member is a coil spring surrounding the projection and the coil spring is compressed to such an extent that a clearance is formed between any two adjacent turns of the coil spring when the valve body is moved into contact with the support member.

* * * * *